March 9, 1965 J. J. DIETZ 3,172,291
MOVEMENTS FOR MEASURING INSTRUMENTS
Filed Sept. 7, 1961 3 Sheets-Sheet 1
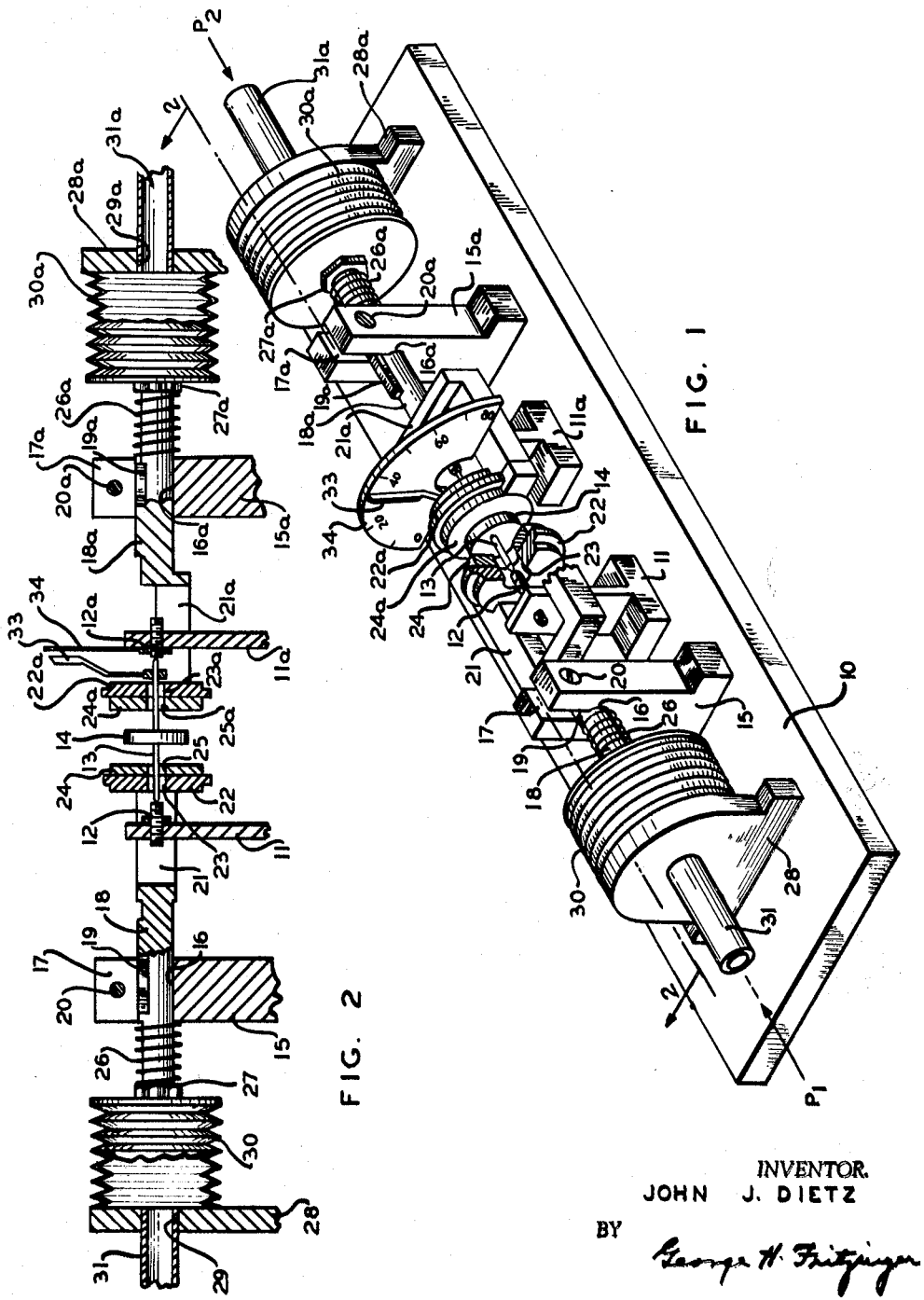
INVENTOR.
JOHN J. DIETZ
BY George H. Fritzinger
AGENT

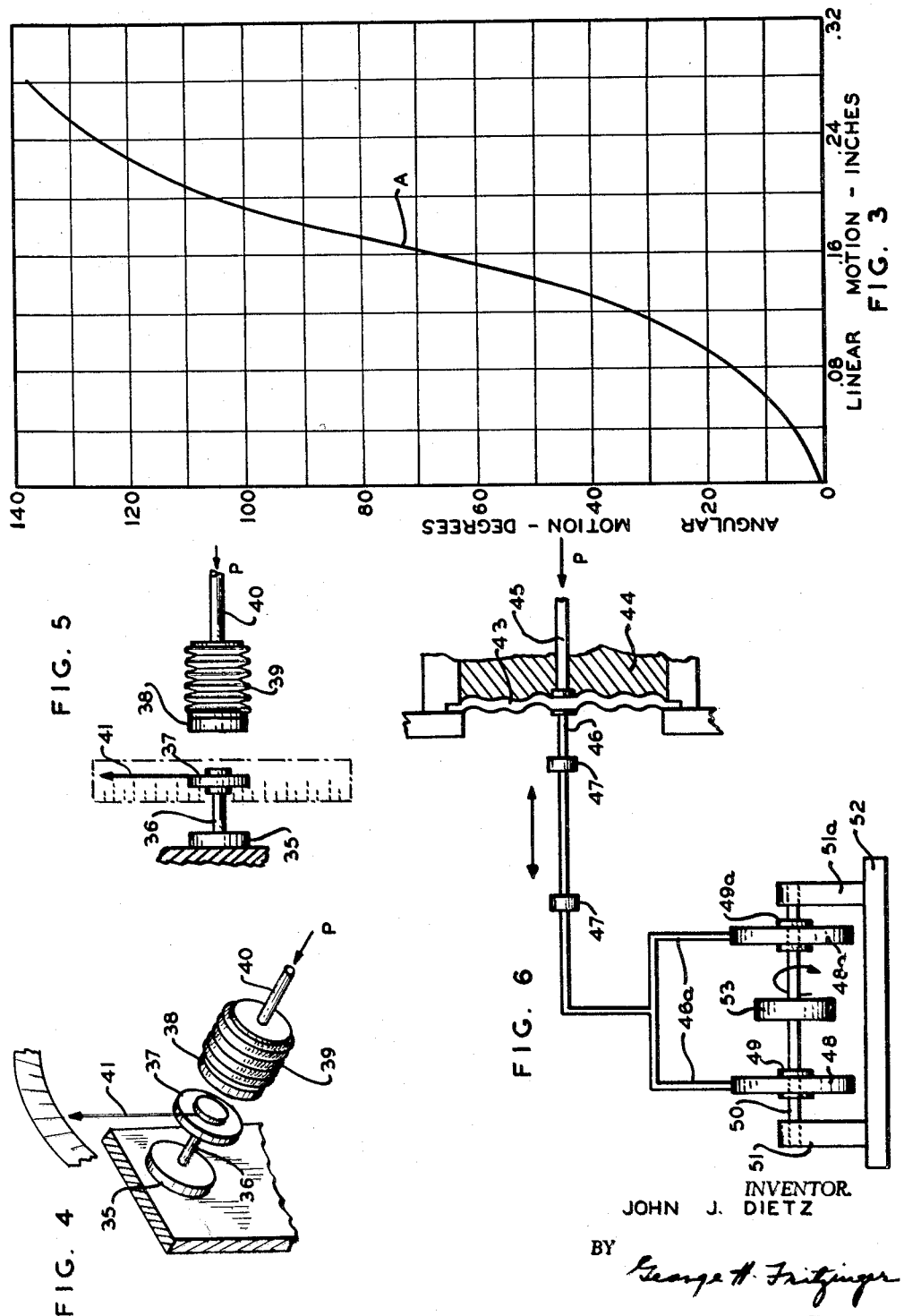

March 9, 1965  J. J. DIETZ  3,172,291
MOVEMENTS FOR MEASURING INSTRUMENTS
Filed Sept. 7, 1961  3 Sheets-Sheet 3

INVENTOR.
JOHN J. DIETZ
BY
George H. Fritzinger
AGENT

United States Patent Office 3,172,291
Patented Mar. 9, 1965

3,172,291
MOVEMENTS FOR MEASURING INSTRUMENTS
John J. Dietz, Cedar Grove, N.J., assignor to McGraw-Edison Company, Elgin, Ill., a corporation of Delaware
Filed Sept. 7, 1961, Ser. No. 136,572
5 Claims. (Cl. 73—388)

This invention relates to novel movements for measuring instruments wherein an armature magnet is moved according to the ratio of two superimposed magnetic fields. In a particular aspect the invention relates to a linkless rectilinear-to-rotary motion converter and to measuring and/or control instruments employing such a converter.

An object of the invention is to provide a simple form of such motion converter which is adapted especially for use in the measuring and control fields.

Another object is to provide an improved motion converter which is especially useful in applications where it is desired to transmit rectilinear-to-rotary motion through a hermetic seal.

Another object is to provide a novel form of such motion converter which utilizes permanent field and armature magnets as the coupling means.

A further object is to provide improved measuring and/or control instruments employing such motion converter.

These and other objects and features of the invention will be apparent from the following description and the appendant claims.

In the description of the invention reference is had to the accompanying drawings of which:

FIGURE 1 is a perspective view of an instrument for measuring differential pressure wherein there is employed a rectilinear-to-rotary motion converter according to the invention;

FIGURE 2 is a fractional sectional view taken on the line 2—2 of FIGURE 1;

FIGURE 3 is a graph showing the relationship between the angular positioning of the indicating element of the instrument of FIGURE 1 when one of the pressure sources is fixed and the other is variable.

FIGURE 4 is a perspective view of an absolute pressure gauge employing a motion converter according to the invention between a single pressure responsive bellows and a pivoted indicating element;

FIGURE 5 is a side view of the pressure gauge of FIGURE 4; and

FIGURE 6 is a diagrammatic view of another pressure gauge employing a modified form of the motion converter.

Figure 7:
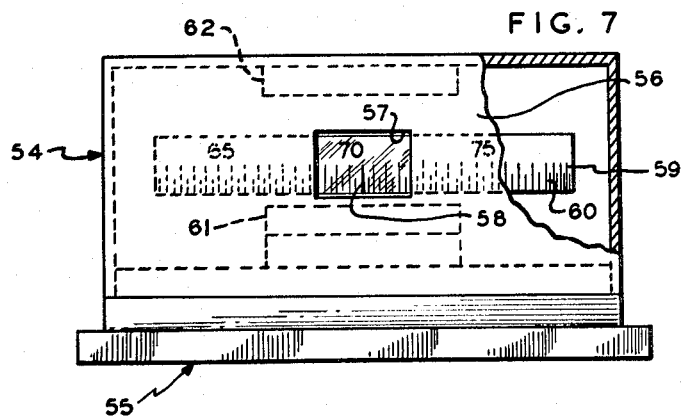
FIGURE 7 is a front view of a desk thermometer embodying the invention.

An instrument which demonstrates the principle of the invention comprises a rectangular base 10 having on its central portion two upright standards 11 and 11a spaced from each other lengthwise of the base as shown in FIGURE 1. Threaded through upper portions of these standards are screws 12 and 12a having ball bearings therein which receive respective ends of a shaft 13. Mounted rigidly on the central portion of the shaft is an armature 14 consiting of a disc-shaped permanent magnet magnetized on a diameter line thereof.

At the far sides of the standards 11 and 11a are additional respective standards 15 and 15a having bearing holes 16 and 16a axially in line with the shaft 13 and having respective slots 17 and 17a extending through the standards in directions lengthwise of the base and through the upper faces of the standards. Connecting rods 18 and 18a with respective keys 19 and 19a extend slidably through the bearing holes 16 and 16a with the keys thereof engaging the respective slots 17 and 17a to prevent the rods from turning. Screws 20 and 20a in the upper slotted portions of the standards 15 and 15a serve as a means of adjusting the bearings to receive the respective support rods with a free sliding fit without play as well as a means for clamping either connecting rod in a fixed position.

Secured rigidly to the inner end portions of the connecting rods 18 and 18a are respective non-magnetic yokes 21 and 21a disposed parallel to the base 10 in straddling relation with the standards 11 and 11a. Secured to the ends of the arms of the yokes 21 and 21a are nonmagnetic discs 22 and 22a having central holes 23 and 23a clearing the shaft 13. Secured to the inner faces of these non-magnetic discs are respective disc-shaped permanent field magnets 24 and 24a having center holes 25 and 25a also clearing the shaft. The field magnets are positioned so that they are coaxial with the shaft 13 and parallel to each other as well as to the armature magnet 14. Also, the permanent field magnets are magnetized on diameter lines which are angularly shifted from each other preferably at 180°.

The connecting rods 18 and 18a are urged in directions away from each other by respective compression springs 26 and 26a surrounding the rods and located between the standards 15 and 15a and respective collars 27 and 27a threaded on the rods. Positioned on the far end portions of the base 10 are standards 28 and 28a with respective center holes forming ports 29 and 29a as will appear. Secured to the inner sides of these standards are respective bellows 30 and 30a having their inner movable walls secured to the connecting rods 18 and 18a respectively. These bellows are coupled to respective sources of pressure $P_1$ and $P_2$ via coupling tubes 31 and 31a leading from the ports 29 and 29a.

Provided on the armature magnet 14 in parallel relation to its magnetic axis is a pointer 33 which registers with an arcuate scale 34 graduated for example in terms of the differential pressures in the bellows 30 and 30a. The scale is fixedly mounted for example on the standard 11a.

When the field magnets have equal strength and are equally spaced from the armature magnet the intensities of the magnetic fields at the armature magnet are equal to cause the armature magnet to assume a mid-position wherein its magnetic axis is at right angles to those of the field magnets. The pointer 33 then registers with a mid point on the scale 34. If both field magnets are moved equally towards or away from the armature magnet the relative field strengths at the armature magnet remain the same and the pointer will continue to register at the mid point of the scale. However, if one field magnet is held stationary and the other field magnet is moved towards the armature magnet the latter is turned proportionately in a direction to bring its north and south poles more nearly in registration with the respective south and north poles of the more closely positioned field magnet. Conversely, as the other field magnet is moved away from the armature magnet the latter will be turned in the other direction to bring its north and south poles more nearly in registration with the respective south and north poles of the stationary field magnet. For example, if one field magnet is held stationary at .018″ from the armature magnet and the other field magnet is moved at varying distances from the armature magnet the armature magnet will be turned to different angular positions in accordance with curve A shown in FIGURE 3. Thus, the pointer will indicate the differential pressure of the two pressure sources $P_1$ and $P_2$ throughout a range of absolute pressure thereof. It will be noted that in the range of movement of the other field magnet from about .1″ to about .2″ from the armature magnet the latter is turned through a range of about 100° in a substantially linear relationship.

By way of example, when identical field and armature magnets are used each ⅛″ thick and ⅝″ in diameter, and the magnets are made of Alnico II, a torque of 14 grams centimeters is produced and a torque to weight ratio of 1.5 grams centimeters per 100° rotation is obtained.

An application of the present motion converter to an absolute pressure gauge is shown in FIGURES 4 and 5. This gauge comprises a fixedly mounted disc-shaped field magnet 35 having a central shaft 36 secured thereto on which is freely rotatably journaled a disc-shaped armature magnet 37 in coaxial relationship therewith and at a fixed distance therefrom. On the other side of the armature magnet is a movable disc-shaped field magnet 38 mounted on the end wall of a bellows 39 and confined in a coaxial relationship with the armature magnet as by an extension 36a of the shaft 36 slidably engaging a central hole in the field magnet. The bellows 39 has its other end wall fixedly mounted and provided with a port 40 to be connected to a source of pressure to be measured. A pointer 41 on the armature magnet registers with a fixed scale 42 which is calibrated so that the pointer reads directly the pressure in the bellows.

Another pressure gauge employing a modified form of the invention is illustrated diagrammatically in FIGURE 6. This gauge comprises a capsule 43 mounted in a stationary frame 44 and connected through a tube 45 to a source of pressure to be measured. The capsule has a movable diaphragm connected to a rod 46 slidable in bearings 47. The rod is connected through a U extension 46a to two field magnets 48 and 48a to hold the field magnets in a fixed relation to each other and to shift the magnets in unison responsive to expansion and contraction of the capsule. The two field magnets are guided by bearings 49 and 49a on a shaft 50 journaled in two standards 51 and 51a of a frame 52. Mounted on the shaft between the field magnets is an armature magnet 53. The field and armature magnets are preferably disc shaped. Also, the magnets are magnetized on diameter lines and the magnetic axis of the field magnets are located in the same plane but are oppositely directed to each other.

This modified form of motion converter is characterized as having a greater angular deflection per incremental displacement of the field magnets than the first embodiment above described. Also, this modified embodiment has a greater angular range of deflection of the armature magnet, a range which extends beyond 180°. However, the range over which the angular deflection of the armature magnet is substantially linearly proportional to the displacement of the field magnets is less than that of the first embodiment.

Figure 8:
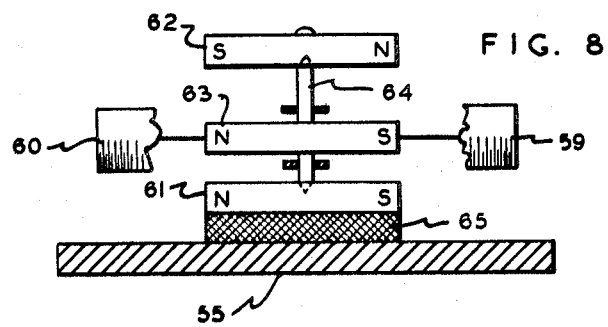
FIGURE 8 is a side view of the internal mechanism of the thermometer of FIGURE 7.

An application of the invention to a desk thermometer is shown in FIGURES 7 and 8. This thermometer may comprise a rectangular housing 54 having a base 55 and a front cover 56. The front cover may have a transparent opening or window 57 provided with a centrally located and vertically extending index line 58. Back of this window is a rotatable drum 59 having a temperature scale 60 thereon for indicating temperature with reference to the index line 58.

Figure 9:
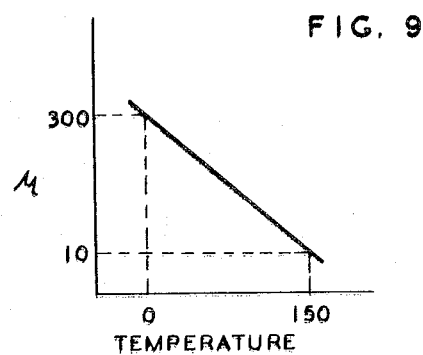
FIGURE 9 shows the temperature-permeability characteristic of a temperature sensitive element for this thermometer.

This thermometer comprises two spaced coaxial field magnets 61 and 62 both fixedly mounted, and a coaxial rotary armature magnet 63 midway between the field magnets. Each magnet may be disc-shaped and be magnetized on a diameter line thereof. The magnetic axis of one field magnet is angularly shifted with respect to that of the other preferably at 180°. The armature magnet is mounted on a shaft 64 journaled at its ends as for example at the centers of field magnets. The armature magnet therefor assumes normally a position wherein its magnetic axis is midway—i.e., displaced 90°—from the magnetic axis of the field magnets assuming that the two field magnets have equal strength. Positioned flat against the back side of one field magnet, for example the magnet 61, is a bar 65 of a temperature sensitive alloy having for example a temperature-permeability characteristic as shown in FIGURE 9. This bar provides a high magnetic shunt on the field magnet 61 at low temperatures and a low shunt thereon at high temperatures, and has therefore the effect of causing the field flux of this field magnet to have a low intensity at the armature magnet at low temperatures and a relatively high intensity at high temperatures. This variation of the magnetic flux of the field magnet 61 at the armature magnet is accordingly as though the field magnet were moved away from the armature magnet as the temperature falls and moved toward the armature magnet as the temperature rises. Accordingly, the armature magnet is deflected about its pivot axis by this variation in the field flux as before described, and this deflection will in turn rotate the drum 59 carried by the armature magnet to indicate the temperature of the temperature sensitive bar 65 by the reading of the index line 58 relative to the scale 60. An advantage of this thermometer construction is that the armature magnet is the only moving element of the instrument.

The embodiments of my invention herein particularly shown and described are intended to be illustrative and not necessarily limitative of my invention, since the same are subject to changes and modifications without departure from the scope of my invention, which I endeavor to express according to the following terms.

I claim:

1. A movement for a measuring instrument comprising two parallel field magnets coaxially mounted and spaced from each other, said magnets being polarized in directions angularly shifted from each other, an armature magnet between said field magnets mounted at its geometric center for free pivotal movement about the common axis of said field magnets and magnetized on a transverse axis normal to its pivot axis, means operatively associated with one of said field magnets for rectilinearly shifting said one magnet along its axis whereby to increase and decrease the intensity of the flux field of said one field magnet at said armature magnet relative to that of said other field magnet whereby to cause said armature magnet to be deflected about its pivot axis, and means for rectilinearly shifting the other of said field magnets along its axis independently of said one field magnet whereby the angular positioning of the armature magnet is an indication of the differential spacing of the field magnets from the armature magnet.

2. The movement set forth in claim 1 wherein said field and armature magnets are disc-shaped and magnetized on respective diameter lines, and wherein said field magnets have center holes and said armature magnet has a pivot shaft extending freely through said center holes, including fixed pivots for said shaft at the outer sides of the field magnets.

3. The movement set forth in claim 1 including means responsive to variations in a predetermined condition for operating one of said shifting means, a fixed scale calibrated in terms of said condition, and a pointer secured to said armature shaft for movement across said scale by pivotal movement of said armature magnet to indicate the value of said predetermined condition.

4. The movement set forth in claim 3 including a second means responsive to variations in another predetermined condition for operating the other of said shifting means independently of variations in said first mentioned predetermined condition.

5. A rectilinear-to-rotary motion converter comprising two parallel and coaxial disc-shaped permanent magnets mounted for relative linear movement along their geometrical axis, said magnets being magnetized on diameter lines with one polarized in a direction opposite to the other, a disc-shaped armature magnet between said field magnets, means mounting said armature magnet in coaxial relationship with said field magnets and for free pivotal movement about its geometrical axis while holding the armature magnet constrained against rectilinear movement, said armature magnet being magnetized on a diameter line to cause the armature magnet to assume an angular position normal to the magnetic axes of the field magnets when the field magnets are relatively spaced to cause their respective fields to be of equal strength at the armature magnet, means for shifting one of said field magnets along its geometrical axis relative to said armature magnet to change the relative field strength of the field magnets at the armature magnet and cause the armature magnet to be deflected in one direction and the other as said one field magnet is moved toward and away from the armature magnet, coaxial shafts secured respectively to said field magnets, fixed bearings in which said shafts are slidably mounted and splined against rotary movement whereby the field magnets are confined to rectilinear movement towards and away from the armature magnet, and condition responsive means connected respectively to said coaxial shafts for shifting said field magnets relative to said armature magnet.

References Cited by the Examiner
UNITED STATES PATENTS

| | | |
|---|---|---|
| 2,201,836 | 5/40 | McCune. |
| 2,350,329 | 6/44 | Hornfeck _____ 73—362 |
| 2,627,750 | 2/53 | Titus _____ 73—407 |
| 2,790,095 | 4/57 | Peek et al. |
| 2,943,216 | 6/60 | Spodig _____ 310—103 |

ISAAC LISANN, *Primary Examiner.*